April 7, 1953  B. F. SMITH  2,634,170
PNEUMATIC CONVEYER SYSTEM
Filed Jan. 19, 1948
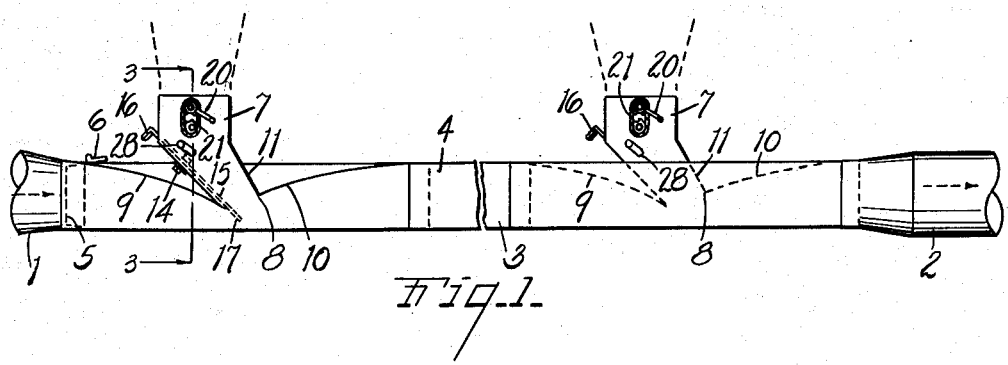
*Fig. 1.*
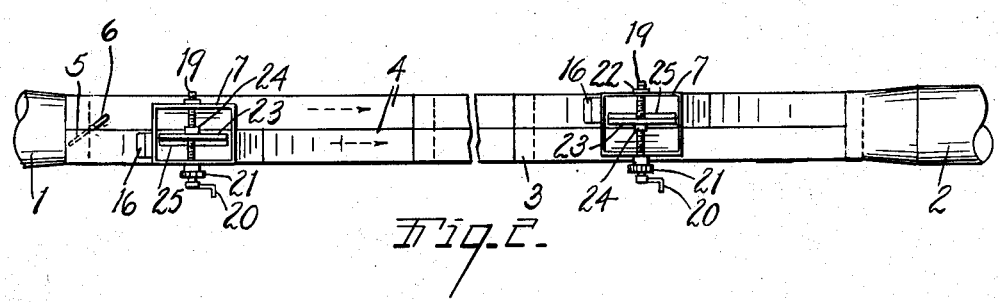
*Fig. 2.*
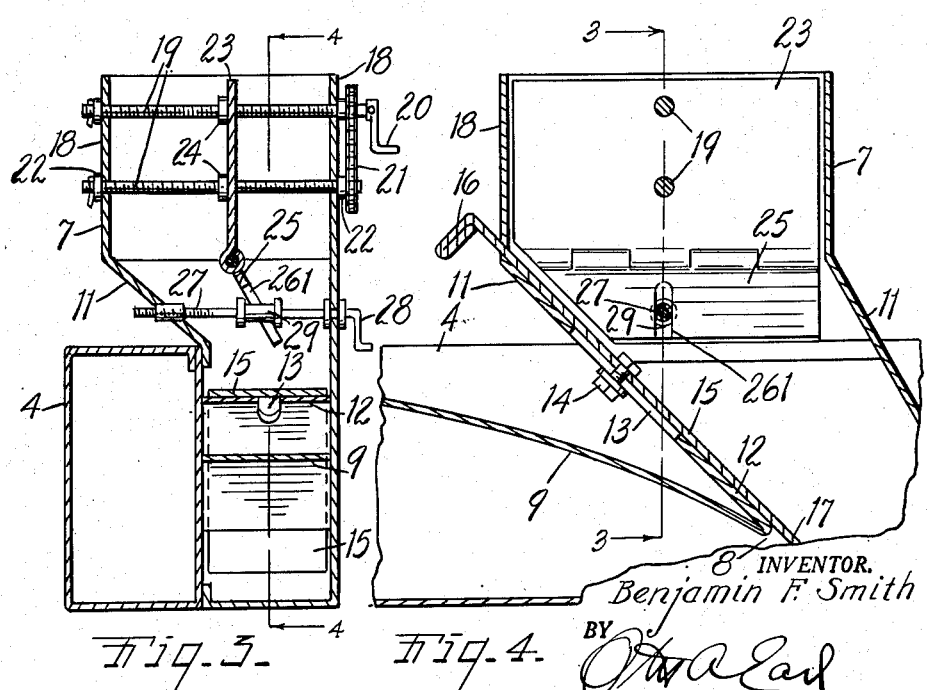
*Fig. 3.*  *Fig. 4.*
INVENTOR.
Benjamin F. Smith
BY
ATTORNEY.

Patented Apr. 7, 1953

2,634,170

UNITED STATES PATENT OFFICE 2,634,170

PNEUMATIC CONVEYER SYSTEM

Benjamin F. Smith, Lamont, Mich., assignor to Electric Sorting Machine Company, Grand Rapids, Mich.

Application January 19, 1948, Serial No. 3,114

6 Claims. (Cl. 302—27)

This invention relates to improvements in a pneumatic conveyor system.

The principal objects of this invention are:

First, to provide conduits and loading hoppers for a pneumatic conveyor system which will permit a single duct to be loaded at different positions along its length without loss of efficiency of the system.

Second, to provide a system of introducing material to be conveyed into a single pneumatic conveyor duct without requiring excessively high pressures and velocities in the duct.

Third, to provide loading hoppers for a pneumatic conveyor duct by means of which a plurality of different types of materials may be simultaneously introduced into the duct in predetermined proportions and at spaced intervals along the duct.

Fourth, to provide a loading section which may be installed at any point in the length of a pneumatic conveyor to permit the introduction of material to be conveyed at spaced points along the duct.

Other objects and advantages relating to details and economies of the invention will appear from the description to follow. The invention is defined in the claims.

The drawings, of which there is one sheet, illustrate, a preferred form of my conveyor system.

Fig. 1 is a side elevational view of my system.

Fig. 2 is a plan view of my system.

Fig. 3 is a vertical transverse cross sectional view along the line 3—3 in Figs. 1 and 4.

Fig. 4 is a vertical longitudinal cross sectional view along the line 4—4 in Fig. 3.

In the drawings, the reference numeral 1 indicates an inlet duct from a suitable blower or other source of air under pressure (not shown) and 2 represents an outlet duct of approximately the same size as the inlet duct 1. The ducts 1 and 2 may be of any desired cross section, the circular sections illustrated being an example only. Connected between the ducts 1 and 2 is my loading section 3 which consists of parallel rectangular conduits 4, the sum of whose cross sectional area is approximately equal to the cross sectional area of the outlet duct 2. The inlet end of the loading section 3 is provided with a vane or damper 5 operated by the handle 6 and by means of which the proportion of air passing through the two conduits may be varied.

Each of the conduits 4 is provided with a loading hopper 7 spaced longitudinally along the charging section of the conveyor so that the hopper opening into the forward or right-hand conduit as viewed in the drawings is positioned closer to the inlet duct 1 than the hopper for the rear conduit. Each of the rectangular conduits 4 has a restricted throat 8 formed by curving downwardly the entrance side of the top wall 9 of the conduit as indicated in Figs. 1 and 4 and correspondingly upwardly curving the top wall of the conduit as at 10 behind the hopper 7. The lower ends of the hopper 7 taper to form a chute 11 opening to the throat of the conduit to which they are attached and the forward wall 12 of the chute joins with the inlet wall 9 of the conduit to form a lip in the entrance to the throat. The forward wall 12 defines a slot 13 arranged to pass the bolt 14 for adjustably securing a flat gate member 15 along the inner surface of the forward wall 12. The gate 15 projects along the upper edge of the wall 12 and is provided with a fold 16 forming a handle so that the gate may be pushed downwardly into the throat 8 as is indicated at 17 to further constrict the throat of the conduit.

The upper body of each hopper 7 is provided with parallel side walls 18 which are apertured to rotatably support the parallel screw shafts 19 extending transversely of the conduits. One shaft is provided with a crank 20 and a chain 21 connects the two shafts for simultaneous rotation. Collars 22 on the shafts prevent their axial movement relative to the side walls 18. Positioned within each hopper is a divider plate 23 which is apertured to pass the screw shafts 19 and is provided with threaded bosses 24 engaging the threads of the shafts so that as the crank 20 is turned, the divider plate 23 will be moved laterally of the hopper. The lower end of the divider plate 23 is provided with a hinged fin 25 slotted on its lower edge as at 26l. The slot 26l passes a threaded rod 17 having a crank 28 on its forward end. The rod 27 engages a flanged spool 29 and is thus arranged to adjust the position of fin 25.

As is well known in the art of conveying granular or fragmentary materials by means of pneumatic ducts, the economical pressure and velocity for conveying a given amount of a given material in any given duct is determined by the resistance to movement of the air and material offered by the particular discharge duct, corresponding to the duct 2 in the drawings. It is also well known in the pneumatic conveyor art to introduce the material to be handled into the duct by means of a hopper opening into a constricted throat in the duct similar to the hoppers illustrated in the drawings. In operating these conveyor systems, sufficient pressure and velocity head is maintained in the duct to carry the material to the end of the discharge duct. The throat at the bottom of the hopper operates to convert the pressure head in the duct largely to a velocity head so that air moves past the throat at relatively high velocity and with a low or negative static pressure. As a consequence of the low static pressure, the material in the hopper is sucked into the throat and carried along by the high velocity air.

In the past, it has been found that the use of two throats and loading hoppers at longitudinally spaced points along a single conveyor duct was impractical because the second throat and hopper toward the discharge end of the conveyor acted as a high resistance to the flow of air in the conveyor so far as the first throat and hopper was concerned. This meant that a much higher static pressure had to be maintained between the two hoppers than would be required to move the same amount of material and air through the discharge duct alone. As a result, the pressure and velocity heads maintained in the inlet duct had to be correspondingly increased; then, in order to reduce the static pressure at the throat of the first hopper, excessively high velocities were created at that point. This system required larger and more powerful fans or blowers which were uneconomical for conveying the amount of material which could be handled.

By use of my divided loading conduits, each of the conduits and its throat opens into the discharge duct 2 in which the static pressure and velocity head is maintained at the same economical level that is required to move the air and product to the end of the duct, regardless of the arrangement of hoppers ahead of the outlet duct. Therefore, the pressure and velocity heads of the air at each of the loading throats need to be no higher than is necessary for a system with a single conduit and throat. Since the pressure is substantially equal between the two sections of the divided conduit, I am able to employ a blower for the inlet duct 1 of substantially the same size as would be used for a duct having a single charging throat and am still able to introduce material into the conduits at points spaced longitudinally along the duct. This is of distinct advantage in plants and factories where the output of two or more processing machines is to be conveyed to a single bin or storage space. The machines may be spaced for ease and convenience of operation and a single pneumatic conveyor duct may extend past their delivery spouts and the material fed into the conveyor system by means of my multiple loading section. I have shown a conveyor duct with two feed hoppers, but obviously more hoppers could be employed by dividing the loading section into more conduits.

The divider plates 23 permit two products to be introduced into the conveyor duct in any desired proportion, the proportion being varied by adjustment of the plates 23 in the hoppers. Each of the plates 23 in a series of hoppers can be set at the same relative positions and each of the hoppers will then admit the same total amount of material and in the same proportions to the conveyor duct at all times, so long as the vane 5 is adjusted for equal air flow in the two conduits. Adjustment of the vane 5 to direct a greater proportion of the air through one of the ducts will permit a larger amount of the material to be loaded in one of the hoppers than the other.

The vanes 25 on the lower edges of the divider plates are adjustable by means of the cranks 28 to adjust for different factors of weight and sliding friction of the two materials being introduced through each hopper. By use of the vanes 25 the dividers 23 can be adjusted so that the hoppers 7 are divided into two sections in the same proportion as the desired proportion of the two materials to be mixed in the conveyor. Then if one of the materials tends to run through the hopper at a faster rate than the other due to a difference in its physical properties, the vanes 25 can be adjusted until the masses of the materials in each part of the hoppers settle at a uniform rate. This procedure gives a rapid visual check of the proportions of the materials entering the conveyor at each hopper and eliminates the necessity of pre-weighing the materials or lengthy experimentation in the setting of the dividers 23.

If desired, the separate conduits with their loading throats and hoppers may be spaced laterally care being taken to maintain the total air resistance of each conduit approximately equal.

My conveyor and charging system is operable for handling seeds, beans, grains, nut meats, sand, gravel, cement and any other such loose or unconsolidated products as are presently handled by pneumatic conveyors.

I have described a highly practical commercial embodiment of my system so that others may reproduce and adapt the system to pneumatic conveyor ducts as is desired.

Having thus described my invention, what I claim as new and desire to secure by Letters Patent, is:

1. A pneumatic conveyor system comprising, an inlet duct arranged to supply air under a pressure and velocity head at one end, an outlet duct having its inlet end widely spaced from said end of said inlet duct, a charging section over several feet in length connected between said ends of said ducts, said charging section defining two equal conduits, the sum of whose cross sectional areas is approximately equal to the area of said outlet duct, a single constricted throat formed in each of said two conduits and spaced longitudinally of said charging section, loading hoppers having chutes opening to said throats, gate plates in said chutes for adjusting the opening of said throats, and a vane adjustably positioned at the entrance end of said conduits for dividing the amount of air entering said conduits from said inlet duct.

2. A pneumatic conveyor system comprising, an inlet duct arranged to supply air under pressure and velocity head at one end, an outlet duct having its inlet end widely spaced from said end of said inlet duct, a charging section over several feet in length connected between said ends of said ducts, said charging section defining two equal conduits, a single constricted throat formed in each of said two conduits and spaced longitudinally of said charging section, loading hoppers having chutes opening to said throats, gate plates in said chutes for adjusting the opening of said throats, and a vane adjustably positioned at the entrance end of said conduits for dividing the amount of air entering said conduits from said inlet duct.

3. A pneumatic conveyor system comprising, an inlet duct having a delivery end, an outlet duct having its inlet end widely spaced from said end of said inlet duct, a charging section over several feet in length connected between said ends of said ducts, said charging section defining a plurality of conduits, the sum of whose cross sectional areas is approximately equal to the area of said outlet duct, a single throat formed in each of said conduits and spaced longitudinally of said charging section, loading hoppers having chutes opening to said throats, divider plates adjustably mounted in said hoppers, and vane means positioned at the entrance end of said conduits for dividing the amount of air entering said conduits from said inlet duct.

4. A pneumatic conveyor system comprising, an inlet duct having a delivery end, an outlet duct having its inlet end widely spaced from said end of said inlet duct, a charging section over several feet in length connected between said ends of said ducts, said charging section defining a plurality of conduits, a single throat formed in each of said conduits and spaced longitudinally of said charging section, loading hoppers having chutes opening to said throats, and vane means positioned at the entrance end of said conduits for dividing the amount of air entering said conduits from said inlet duct.

5. A pneumatic conveyor system comprising, an air inlet duct arranged to supply air under a pressure and velocity head at one end, an outlet duct having its inlet end widely spaced from said end of said inlet duct, a charging section over several feet in length connected between said ends of said ducts, said charging section defining two conduits of equal length the sum of whose cross sectional areas is approximately equal to the area of said outlet duct, a single constricted throat formed in each of said conduits and spaced longitudinally of said charging section, loading hoppers having chutes opening to said throats, vertical divider plates adjustably mounted in said hoppers, and vanes hingedly connected to the bottoms of said plates and adjustable independently of said divider plates whereby the rate of flow of material into said conduits from each side of said plates may be adjusted to obtain equal rates of fall on each side of said plates.

6. A pneumatic conveyor system comprising, an air inlet duct arranged to supply air under a pressure and velocity head at one end, an outlet duct having its inlet end widely spaced from said end of said inlet duct, a charging section over several feet in length connected between said ends of said ducts, said charging section defining two conduits, a single constricted throat formed in each of said conduits, loading hoppers having chutes opening to said throats, vertical divider plates adjustably mounted in said hoppers, and vanes hingedly connected to the bottoms of said plates and adjustable independently of said divider plates whereby the rate of flow of material into said conduits from each side of said plates may be adjusted to obtain equal rates of fall on each side of said plates.

BENJAMIN F. SMITH.

REFERENCES CITED

The following references are of record in the file of this patent:

UNITED STATES PATENTS

| Number | Name | Date |
| --- | --- | --- |
| 1,160,283 | Hay | Nov. 16, 1915 |
| 1,852,535 | Moore | Apr. 5, 1932 |
| 1,893,505 | Nungesser | Jan. 10, 1933 |